United States Patent [19]

Repman et al.

[11] Patent Number: 4,927,621

[45] Date of Patent: May 22, 1990

[54] PURIFICATION OF ANHYDROUS HYDROGEN CHLORIDE

[75] Inventors: Joseph F. Repman, Angleton; Thomas E. Morris; Thomas F. Hill, Jr., both of Lake Jackson, all of Tex.

[73] Assignee: The Dow Chemical Company, Midland, Mich.

[21] Appl. No.: 303,513

[22] Filed: Jan. 27, 1989

[51] Int. Cl.$^5$ ............................ C01B 7/07; B01D 3/00
[52] U.S. Cl. ................................ 423/488; 423/245.1; 423/DIG. 10; 204/157.3
[58] Field of Search ........... 204/157.3, 157.44, 157.47, 204/157.48, 158.2; 423/DIG. 10, 245.1, 488; 208/262.5

[56] References Cited

U.S. PATENT DOCUMENTS

| | | | |
|---|---|---|---|
| 3,446,586 | 5/1969 | Young | 23/154 |
| 4,035,473 | 7/1977 | Urioste et al. | 423/488 |
| 4,045,316 | 8/1977 | Legan | 204/157.3 |
| 4,144,152 | 3/1979 | Kitchens | 208/262.5 |
| 4,206,188 | 6/1980 | Megerle | 423/245 |
| 4,388,278 | 6/1983 | Schmidhammer et al. | 423/488 |
| 4,668,833 | 5/1987 | Ohshima et al. | 570/241 |
| 4,695,357 | 9/1987 | Boussert | 204/157.48 |

FOREIGN PATENT DOCUMENTS 2165827  4/1986  United Kingdom ............ 204/157.3

OTHER PUBLICATIONS

Chemical Abstracts, vol. 70, 1969, 57102j.
Derwent 86-246278/38 (DE 3508371-A).
Derwent 84-050765/09 (EP 101127-A).
Derwent 82-36707E/18 (SU 842016-B).
Derwent 76-15140X/09 (DE 2438153-A).
Derwent 75-60894W/37 (GB 1405714-A).

*Primary Examiner*—Jeffrey E. Russel
*Assistant Examiner*—Brian M. Bolam
*Attorney, Agent, or Firm*—Robert W. Selby

[57] ABSTRACT

A method to purify impure gaseous hydrogen chloride containing an unsaturated chlorinated hydrocarbon contaminant in an amount less than that necessary to inhibit purification, comprising exposing the impure hydrogen chloride to an ultraviolet light source in the presence of gaseous chloride for a sufficient time for the gaseous chloride to react with organic impurities in the hydrogen chloride to form heavier organic compounds and thereafter separating the heavier compounds from the hydrogen chloride.

46 Claims, No Drawings

PURIFICATION OF ANHYDROUS HYDROGEN CHLORIDE

BACKGROUND OF THE INVENTION

This invention pertains to hydrogen chloride and more in particular to a method to remove impurities from anhydrous hydrogen chloride.

Hydrogen chloride is produced as a byproduct in many chemical processes. Frequently the byproduct hydrogen chloride is contaminated with organic compounds which make the hydrogen chloride unsuitable for certain applications. For example, use of anhydrous hydrogen chloride in the electronics industry for semiconductor purposes requires hydrogen chloride with a minimal amount of organic impurities. Various procedures have been previously used to reduce the level of organic compounds, for example, chlorinated compounds in hydrogen chloride with varying degrees of success. Hydrogenation utilizing platinum or palladium based catalysts to convert acetylene to ethane has been employed: however, this process is ineffective in removing saturated hydrocarbons from the hydrogen chloride. Hydrochlorination using aluminum, zinc or mercuric chloride based catalysts will convert ethylene and acetylene to chlorinated organics. Oxidation technology wherein oxygen is added to the hydrogen chloride at high temperatures to oxidize acetylene to carbon dioxide results in the so treated hydrogen chloride being contaminated with carbon dioxide which is difficult to remove by conventional distillation. The oxidation technology is also deficient in that it requires relatively large amounts of energy to achieve the relatively high temperatures required.

A process is needed to purify impure gaseous hydrogen chloride economically and rapidly without requiring high temperatures.

SUMMARY OF THE INVENTION

A method is described for the purification of an impure gaseous hydrogen chloride containing an unsaturated chlorinated hydrocarbon in an amount less than that necessary to inhibit purification. The impure hydrogen chloride is exposed to an ultraviolet light source in the presence of gaseous chlorine for a sufficient time for the gaseous chlorine to react with organic impurities in the hydrogen chloride to form heavier organic compounds. The heavier compounds are thereafter separated from the hydrogen chloride.

DESCRIPTION OF THE PREFERRED EMBODIMENTS

The present invention to decontaminate impure gaseous hydrogen chloride preferably comprises mixing sufficient gaseous chlorine with the impure hydrogen chloride, containing an unsaturated chlorinated hydrocarbon contaminant selected from the group consisting of mono, di and trichloroethylene in an amount less than that necessary to inhibit decontamination, to at least stoichiometrically react with organic impurities in the hydrogen chloride. The impurities to be removed from the hydrogen chloride are organic compounds such as those selected from the group consisting of alkanes, alkenes, alkynes and chlorinated alkanes, alkenes and alkynes. In a preferred embodiment, the impurities in the hydrogen chloride are selected from the group consisting of ethane, ethylene, acetylene, propane and propylene. Other compounds such as methane which may not react significantly with the chlorine to form heavier or more complex organic compounds, may be present in the hydrogen chloride so long as they can be readily removed by standard distillation, filtering and the like techniques. Although the maximum concentration of the organic compound impurity in the hydrogen chloride is not critical so long as the hydrogen chloride is gaseous, it is preferred that such impurities be present in an amount of less than about 1500 ppm by volume.

The gaseous chlorine is preferably present in the hydrogen chloride in an amount in excess of that required to fully react with the organic impurities to form heavier organic compounds. When the chlorine gas is present in an amount of greater than about 300, and more preferably 700, volume parts per million (ppm) of the gaseous hydrogen chloride at the exit from the reactor, at least about 95 and preferably at least about 99 percent of the organic impurities are converted to heavier compounds.

The impure hydrogen chloride-chlorine gaseous mixture is exposed to an ultraviolet light source in a closed reactor to react the organic impurities with the chlorine to form heavier or more complex organic compounds removable from the hydrogen chloride by standard distillation, filtering or other known techniques. The chlorine gas concentration is preferably maintained during exposure to the ultraviolet light source at a concentration greater than that required to stoichiometrically react with the organic impurities in the hydrogen chloride gas.

The reaction time, temperature and pressure may vary considerably without detrimentally affecting the basic characteristics of this invention. The reaction time is determined by the intensity of the ultraviolet light source and the amount of hydrogen chloride being treated. Exposure times of about one, and preferably about three second or greater are satisfactory. Exposure times in excess of about 20 seconds can be employed, but are generally unnecessary.

The temperature at which the reaction is carried out can vary widely depending upon the material of the reactor. Generally, however, it is preferred to use low temperatures. For example, temperatures of from about 40 to about 120° F. are satisfactory.

The herein described method is useful at varying pressures so long as the hydrogen chloride and chlorine remain in the gaseous state. Pressures of up to about 150 pounds per square inch gauge (psig) are operable.

The intensity of the ultraviolet light source can vary substantially based upon the size of the reactor, volume of hydrogen chloride treated in a unit time and the degree to which the hydrogen chloride is contaminated with organic materials. The proper intensity of the light source is readily determined by analyzing the treated hydrogen chloride to determine the impurity concentration. If the unreacted organic material exceeds the desired concentration, the intensity of the light source can be increased or the residence time of the hydrogen chloride in the reactor can be lengthened. A light source with an intensity of at least about 0.05 watts per pound/hour of hydrogen chloride treated is preferred. More preferably, the ultraviolet light source has an intensity of about 0.09 to about 1.5 watts per pound/hour of hydrogen chloride. Most preferably the intensity is about 0.25 to about 1.3 watts per pound/hour of hydrogen chloride.

As above mentioned, the chlorine gas is present in the hydrogen chloride gas before exposure to the light source. It is contemplated and within the scope of this invention, however, to add the chlorine gas to the hydrogen chloride within the reaction chamber during exposure to the ultraviolet light.

The mixture containing hydrogen chloride gas, chlorine gas and the heavier organic compounds formed during exposure to the ultraviolet light are removed from the reactor. The reaction can be carried out on a batch basis, but it is highly preferred that it be performed by continuously feeding the hydrogen chloride-chlorine mixture into the reaction chamber and continuously removing the reacted mixture following exposure to the light source.

The reacted mixture is transferred, preferably continuously, by well known means such as pipes or conduits to an apparatus suitable to remove the heavier organic compounds formed during exposure to the ultraviolet light. Such apparatus can be well known distillation equipment or apparatus; but filtering, centrifugal or other known equipment to separate the reacted contaminating organic compounds are contemplated by the present invention. Transfer of the mixture to the preferred distillation apparatus can be done on a batch basis utilizing, for example, cylinders or tank cars, but it is usually more economical and faster to perform this operation on a continuous basis.

In a preferred embodiment the mixture is distilled to recover gaseous hydrogen chloride containing less than about 5 ppm by volume total organic impurities.

When a stoichiometric excess of chlorine above 700 mole ppm is maintained in the photoreactor product outlet in excess of 99 percent conversion of ethane, ethylene, acetylene, propane and propylene impurities to heavier chlorinated organic compounds can occur.

The following examples will further exemplify the hereinbefore described process. It is understood that these examples are merely illustrative of the invention and are not intended to restrict or otherwise limit the scope thereof.

EXAMPLES

In Examples 1-4 chlorine gas (Matheson ultra high purity grade) is mixed with gaseous hydrogen chloride and passed into a photoreactor. The reactor is a vertical 4-inch diameter by 4 ½-foot long schedule 40 carbon steel pipe equipped with a 2-inch diameter Pyrex glass light well. A 3-foot long, 30-watt General Electric ultraviolet lightbulb is positioned within the light well. The gaseous mixture of chlorine and hydrogen chloride is substantially free of the unsaturated chlorinated hydrocarbon contaminant.

The chlorine-hydrogen chloride mixture is continuously passed through the reactor and exposed to the ultraviolet light under the conditions set forth in Table I. Table I also lists the composition of the mixture before and after it is passed through the reactor.

It will be seen that the impure hydrogen chloride gas after exposure to the ultraviolet light contains methane, acetylene, ethylene, ethane, propane and chlorine in quantities readily removable by subsequent distillation or other standard purification procedures. Prior to treatment of the hydrogen chloride and conversion of the organic impurities into heavier chlorinated compounds removal of the impurities listed in Table I from the hydrogen chloride is difficult.

Subsequent to exposure to the light the reacted mixture is transferred to a distillation column and the impurities removed to recover the purified hydrogen chloride product.

TABLE I

| EXAMPLE | 1 | 2 | 3 | 4 |
|---|---|---|---|---|
| Cl$_2$ Flow (# mol/day) | 0.038 | 0.068 | 0.011 | 0.008 |
| HCl Flow (# mol/day) | 56.0 | 56.0 | 72.7 | 15.1 |
| Residence Time (sec) | 3.30 | 3.32 | 3.32 | 19.46 |
| Temperature (deg C.) | 23 | 22 | 18 | 12 |
| Pressure (psig) | 24 | 24 | 35 | 45 |
| Inlet Analysis (Mol %) | | | | |
| Methane | 0.0164 | 0.0051 | 0.0309 | 0.0195 |
| Acetylene | 0.0006 | 0.0008 | 0.0004 | 0.0006 |
| Ethylene | 0.0107 | 0.0109 | 0.0090 | 0.0104 |
| Ethane | 0.0252 | 0.0316 | 0.0076 | 0.0100 |
| Propane | 0.0033 | 0.0018 | 0.0016 | 0.0103 |
| Methyl Chloride | 0.0005 | 0.0003 | 0.0002 | 0.0005 |
| Ethyl Chloride | 0.0009 | 0.0006 | 0.0002 | 0.0017 |
| Isopropyl Chloride | 0.0003 | 0.0004 | 0.0047 | 0.0000 |
| Alpha-dichloroethane | 0.0006 | 0.0000 | 0.0000 | 0.0000 |
| Ethylene Dichloride | 0.0010 | 0.0000 | 0.0000 | 0.0000 |
| Chlorine | 0.0679 | 0.1215 | 0.0146 | 0.0522 |
| Outlet Analysis (Mol %) | | | | |
| Methane | 0.0139 | 0.0054 | 0.0338 | 0.0228 |
| Acetylene | 0.0000 | 0.0000 | 0.0001 | 0.0000 |
| Ethylene | 0.0002 | 0.0001 | 0.0015 | 0.0014 |
| Ethane | 0.0035 | 0.0001 | 0.0052 | 0.0002 |
| Propane | 0.0001 | 0.0001 | 0.0006 | 0.0000 |
| Methyl Chloride | 0.0009 | 0.0010 | 0.0004 | 0.0008 |
| Ethyl Chloride | 0.0209 | 0.0101 | 0.0068 | 0.0026 |
| Isopropyl Chloride | 0.0006 | 0.0008 | 0.0008 | 0.0002 |
| Alpha-dichloroethane | 0.0118 | 0.0167 | 0.0004 | 0.0098 |
| Ethylene Dichloride | 0.0039 | 0.0048 | 0.0000 | 0.0018 |
| Chlorine | 0.0207 | 0.0511 | 0.0092 | 0.0094 |
| Conversions (%) | | | | |
| Methane | 15.24 | — | — | — |
| Acetylene | 100.00 | 100.00 | 100.00 | 100.00 |
| Ethylene | 98.13 | 99.08 | 83.33 | 86.54 |
| Ethane | 86.11 | 99.68 | 31.58 | 98.00 |
| Propane | 96.97 | 94.44 | 62.50 | 100.00 |
| Chlorine | 69.5220 | 57.9552 | 36.9279 | 81.9853 |

What is claimed is:

1. A method to purify impure gaseous hydrogen chloride containing an unsaturated chlorinated hydrocarbon in an amount less than that necessary to inhibit purification, comprising exposing the impure hydrogen chloride to an ultraviolet light source in the presence of gaseous chlorine for a sufficient time for the gaseous chlorine to react with organic impurities in the hydrogen chloride to form organic compounds heavier than the impurities and thereafter separating the heavier compounds from the hydrogen chloride.

2. The method of claim 1 wherein the impurities are chlorinated organic compounds.

3. The method of claim 1 wherein the impurities are selected from the group consisting of alkanes, alkenes, alkynes and chlorinated alkanes, chlorinated alkanes and chlorinated alkynes.

4. The method of claim 1 wherein the impurities are selected from the group consisting of ethane, ethylene, acetylene, propane and propylene.

5. The method of claim 1 wherein gaseous chlorine is present in an amount in excess of that required to fully react with the impurities to form heavier organic compounds.

6. The method of claim 5 wherein the gaseous chlorine is present in an amount of greater than about 300 volume parts per million of the gaseous hydrogen chloride.

7. The method of claim 5 wherein the gaseous chlorine is present in an amount of greater than about 700 volume parts per million of the gaseous hydrogen chloride.

8. The method of claim 1 wherein exposure of the hydrogen chloride gas to the light source is carried out at a temperature of from about 40° to about 120° F.

9. The method of claim 1 wherein the gaseous hydrogen chloride is exposed to the light source for at least about one second.

10. The method of claim 1 wherein the hydrogen chloride is exposed to the light source for from about 3 to about 20 seconds.

11. The method of claim 1 wherein exposure of the hydrogen chloride to the light source is carried out at a pressure at up to about 150 psig.

12. The method of claim 1 wherein the light source has an intensity of at least about 0.05 watts per pound per hour of hydrogen chloride gas treated.

13. The method of claim 1 wherein the ultraviolet light source has an intensity of about 0.09 to about 1.5 watts per pound per hour of hydrogen chloride treated.

14. The method of claim 1 wherein chlorine gas is added to the impure gaseous hydrogen chloride before exposing the hydrogen chloride to the light source.

15. The method of claim 1 wherein the purified hydrogen chloride contains less than about 5 ppm of organic compounds.

16. The method of claim 1 wherein the chlorine gas concentration in the hydrogen chloride is maintained at a concentration greater than to stoichiometrically react with the organic impurities in the hydrogen chloride gas.

17. The method of claim 16 wherein at least about 99 percent of the organic impurities are converted to heavier compounds.

18. The method of claim 17 wherein the impurities are selected from the group consisting of ethane, ethylene, acetylene and propane.

19. The method of claim 1 wherein the hydrogen chloride contains less than about 1500 ppm per volume of the contaminant.

20. A method to decontaminate impure gaseous hydrogen chloride comprising
(a) mixing sufficient gaseous chlorine with the impure hydrogen chloride, containing an unsaturated chlorinated hydrocarbon contaminant in an amount less than that necessary to inhibit decontamination, to at least stoichiometrically react with organic impurities in the hydrogen chloride:
(b) exposing the impure hydrogen chloride-chlorine gaseous mixture to an ultraviolet light source in a closed reactor to react the organic impurities with the chlorine to form organic compounds heavier than the impurities:
(c) removing a mixture containing hydrogen chloride gas, chlorine gas and the heavier organic compounds from the reactor:
(d) transferring the mixture of step (c) to a distillation apparatus: and
(e) distilling the mixture to recover gaseous hydrogen chloride containing less than about 5 ppm by volume total organic impurities.

21. The method of claim 20 wherein the chlorinated hydrocarbon is selected from the group consisting of mono, di and trichloroethylene.

22. The method of claim 3 wherein the chlorinated hydrocarbon is selected from the group consisting of mono, di and trichloroethylene.

23. The method of claim 3 wherein the gaseous chlorine is present in an amount of greater than about 300 volume ppm of gaseous hydrogen chloride.

24. The method of claim 3 wherein the gaseous chlorine is present in an amount of greater than about 700 volume ppm of gaseous hydrogen chloride.

25. The method of claim 4 wherein the chlorinated hydrocarbon is selected from the group consisting of mono, di and trichloroethylene.

26. The method of claim 20 wherein the impurities are chlorinated organic compounds.

27. The method of claim 20 wherein the impurities are selected from the group consisting of alkanes, alkenes, alkynes and chlorinated alkanes, chlorinated alkenes and chlorinated alkynes.

28. The method of claim 20 wherein the impurities are selected from the group consisting of ethane, ethylene, acetylene, propane and propylene.

29. The method of claim 21 wherein the impurities are chlorinated organic compounds.

30. The method of claim 21 wherein the impurities are selected from the group consisting of ethane, ethylene, acetylene, propane and propylene.

31. The method of claim 21 wherein the impurities are selected from the group consisting of alkanes, alkenes, alkynes and chlorinated alkanes, chlorinated alkenes and chlorinated alkynes.

32. The method of claim 31 wherein the hydrogen chloride contains less than about 1500 ppm per volume of the contaminant.

33. The method of claim 31 wherein the gaseous chlorine is present in an amount of greater than about 300 volume ppm of gaseous hydrogen chloride.

34. The method of claim 31 wherein the gaseous chlorine is present in an amount of greater than about 700 volume ppm of gaseous hydrogen chloride.

35. A method to purify impure gaseous hydrogen chloride containing less unsaturated chlorinated hydrocarbon than necessary to inhibit purification, comprising exposing the impure hydrogen chloride to an ultraviolet light source in the presence of gaseous chlorine for a sufficient time for the gaseous chlorine to react with organic impurities in the hydrogen chloride to form distillable organic compounds and thereafter distilling such organic compounds from the hydrogen chloride.

36. The method of claim 35 wherein the impurities are selected from the group consisting of alkanes, alkenes, alkynes and chlorinated alkanes, chlorinated alkenes and chlorinated alkynes.

37. The method of claim 36 wherein exposure of the hydrogen chloride gas to the light source is carried out at a temperature of from about 40° to about 120° F.

38. The method of claim 36 wherein the hydrogen chloride contains less than about 1500 ppm per volume of the contaminant.

39. The method of claim 35 wherein the impurities are selected from the group consisting of ethane, ethylene, acetylene, propane and propylene.

40. The method of claim 39 wherein the chlorinated hydrocarbon is selected from the group consisting of mono, di and trichloroethylene.

41. The method of claim 39 wherein gaseous chlorine is present in an amount in excess of that required to fully react with the impurities.

42. The method of claim 41 wherein the gaseous chlorine is present in an amount of greater than about 300 volume parts per million of the gaseous hydrogen chloride.

43. The method of claim 41 wherein the gaseous chlorine is present in an amount of greater than about 700 volume parts per million of the gaseous hydrogen chloride.

44. The method of claim 41 wherein the gaseous hydrogen chloride is exposed to the light source for at least about one second.

45. The method of claim 44 wherein the light source has an intensity of at least about 0.05 watts per pound per hour of hydrogen chloride gas treated.

46. The method of claim 35 wherein the impurities are selected from the group consisting of ethane, ethylene, acetylene and propane.

* * * * *

UNITED STATES PATENT AND TRADEMARK OFFICE
CERTIFICATE OF CORRECTION

PATENT NO. : 4,927,621

DATED : May 22, 1990

INVENTOR(S) : Joseph F. Repman, Thomas E. Morris, Thomas F. Hill, Jr.

It is certified that error appears in the above-identified patent and that said Letters Patent is hereby corrected as shown below:

On the front page in the sixth line of the Abstract, "chloride" should read correctly --chlorine--.

On the front page in the seventh line of the Abstract, "chloride" should correctly read -- chlorine --.

Column 1, line 22 "employed:" should correctly read -- employed; --.

Column 2, line 38 "second" should correctly read -- seconds --.

Column 4, line 54, second occurrence of "alkanes" should correctly read -- alkenes --.

Column 5, line 49 "chloride:" should correctly read -- chloride; --.

Column 5, line 54 "impurities:" should correctly read -- impurities; --.

Column 5, line 57 "reactor:" should correctly read -- reactor; --.

Column 5, line 59 "apparatus:" should correctly read -- apparatus; --.

Signed and Sealed this

Fourteenth Day of January, 1992

Attest:

HARRY F. MANBECK, JR.

*Attesting Officer*      *Commissioner of Patents and Trademarks*